United States Patent [19]
Treadway

[11] Patent Number: 5,789,082
[45] Date of Patent: Aug. 4, 1998

[54] THERMOSETTING COATING COMPOSITION

[75] Inventor: Gerald D. Treadway, Penngrove, Calif.

[73] Assignee: The Walman Optical Company, Minneapolis, Minn.

[21] Appl. No.: 815,254

[22] Filed: Mar. 12, 1997

[51] Int. Cl.$^6$ .................. B32B 27/36; C08G 77/06; C08K 3/10; C08K 3/34
[52] U.S. Cl. .............. 428/412; 106/287.11; 106/287.12; 106/287.13; 428/328; 428/331; 428/451; 524/409; 524/413; 524/493; 524/494; 528/21
[58] Field of Search ............ 428/412; 106/287.11, 106/287.12, 287.13; 524/409, 413, 493, 494; 528/21

[56] References Cited

U.S. PATENT DOCUMENTS

| | | | |
|---|---|---|---|
| 2,942,019 | 6/1960 | Pike et al. | 556/413 |
| 3,166,527 | 1/1965 | Ender | 523/435 |
| 3,291,775 | 12/1966 | Holm | 528/121 |
| 3,591,408 | 7/1971 | Marzocchi et al. | 8/523 |
| 3,837,876 | 9/1974 | Mayuzumi et al. | 106/287.11 |
| 3,961,977 | 6/1976 | Koda et al. | 106/287.11 |
| 3,986,997 | 10/1976 | Clark | 524/300 |
| 4,027,073 | 5/1977 | Clark | 428/412 |
| 4,029,842 | 6/1977 | Yoshida et al. | 428/334 |
| 4,098,840 | 7/1978 | Yoshida et al. | 525/102 |
| 4,196,014 | 4/1980 | Taniyama et al. | 106/287.13 |
| 4,208,503 | 6/1980 | Martin | 528/14 |
| 4,241,116 | 12/1980 | Taniyama et al. | 427/386 |
| 4,378,250 | 3/1983 | Treadway et al. | 106/287.11 |
| 4,426,431 | 1/1984 | Harasta et al. | 430/14 |
| 4,623,676 | 11/1986 | Kistner | 522/15 |
| 4,668,601 | 5/1987 | Kistner | 430/162 |
| 4,719,146 | 1/1988 | Hohage et al. | 428/331 |
| 4,855,180 | 8/1989 | Kawamura | 428/328 |
| 4,895,767 | 1/1990 | Mori et al. | 428/447 |
| 5,221,560 | 6/1993 | Perkins et al. | 427/515 |
| 5,314,947 | 5/1994 | Sawaragi | 524/780 |
| 5,367,019 | 11/1994 | Sawaragi | 524/780 |
| 5,385,955 | 1/1995 | Tarshiani et al. | 522/31 |

FOREIGN PATENT DOCUMENTS

WO 94/10230  5/1994  WIPO.

*Primary Examiner*—D. S. Nakarani
*Attorney, Agent, or Firm*—Fredrikson & Byron, PA

[57] ABSTRACT

A coating composition for eyeglasses and the like comprises a curable polymer precursor comprising a hydrolyzed epoxy-functional alkoxy silane and an imidazole curing agent therefor, a first colloid sol of a metal oxide colloid selected from the group consisting of the oxides of antimony, zirconium, cerium and tin, and optionally a second colloid sol of a metal oxide colloid different from the colloid of the first colloidal sol.

16 Claims, No Drawings

THERMOSETTING COATING COMPOSITION

FIELD OF THE INVENTION

The invention relates to the field of transparent coatings for transparent objects such as eyeglass lenses, windows and the like, and refers particularly to a coating having an index of refraction essentially equal to that of the substrate that is coated.

BACKGROUND OF THE INVENTION

Transparent plastic materials such as eyeglass lenses, television screen face plates and the protective coatings on photographic prints often are quite soft and are subject to becoming dull and hazy due to scratching and abrasion during use. Polycarbonate eyeglass lenses, for example, are strong and shatter resistant but also are relatively soft and susceptible to scratching. Television screen face plates similarly are made of flexible, shatter resistant plastic materials such as polycarbonate and poly (methylmethacrylate), and these also can be scratched or abraded.

Various coatings have been proposed for eyeglasses and other transparent plastic materials to reduce their propensity to become scratched and abraded. One such composition is shown in U.S. Pat. No. 4,378,250 (Treadway, et al.) granted Mar. 29, 1983. Other coatings are shown in U.S. Pat. No. 5,367,019 (Sawaragi), 4,855,180 (Kawamura), 4,895,767 (Mori et al.) and 4,719,146 (Hohage et al.)

In connection with lenses or other transparent substrates that bear protective coatings, if the refractive index of the coating varies even slightly from the refractive index of the substrate, visible and undesirable interference fringes will appear, particularly when the surface is viewed from an angle rather than perpendicular to the surface. Efforts have been made to produce coatings having high indices of refraction with the expectation that such coatings will avoid the interference fringe problem. Reference is made to Sawaragi et al., U.S. Pat. No. 5,367,019 and 5,314,947, referred to above. Such coatings require thermal curing, which may lengthen production schedules and which also may not be appropriate for use with heat-sensitive substrates. Such coating also may be lacking in the desired hardness and adherence to the transparent substrate, in that the addition of a colloidal sol to increase the index of refraction of the coating and to improve hardness also reduces the amount of polymeric binder that can be used.

Eyeglass lenses often are formed of polycarbonate polymers because of the toughness of this type of polymer. Polycarbonate plastics are more prone to become scratched during normal wear and tear than are acrylics and other polymers used for eyeglass lenses, and hence it is desirable to provide polycarbonate lenses with scratch-resistant coatings. In general, coatings commonly used to provide scratch resistance do not adhere well to polycarbonate surfaces without the use of intermediate primer layers, but the primer layers themselves may contribute to the appearance of unwanted interference fringes and in any event add to the complexity and cost of applying scratch resistant coatings.

Thus, a coating is needed that is capable of producing a very hard and abrasion resistant surface upon curing, that has a refractive index that can be matched to the refractive index of the substrate to be coated, and that exhibits acceptable adhesion to the substrate upon which it is coated.

SUMMARY OF THE INVENTION

The present invention in one embodiment provides a coating composition for eyeglass lenses and other transparent substrates and which is capable of producing a hard coating, the index of refraction of which can be matched, through proper formulating, to the index refraction of the substrate to be coated to thereby avoid visible interference fringes. In its preferred embodiments, the coating exhibits good adhesion to substrates and particularly polycarbonate substrates without the need for intermediate primers or surface pretreatments. Speaking broadly, the invention provides a curable composition in an appropriate solvent, preferably organic, in which the composition comprises a hydrolysis product of an epoxy-functional alkoxy silane and an imidazole curing agent therefor, the imidazole curing agent providing the coating with unexpectedly good adhesion to such substrates as polycarbonate surfaces without the requirement of an intermediate primer layer.

The coating composition of the invention desirably includes one or more, preferably two or more, metal oxide colloidal sols of which one is a colloidal sol of an oxide of antimony, zirconium, cerium or tin. If a second metal oxide colloidal sol is used, it preferably is a different metal oxide colloid with a substantially different index of refraction. By varying the relative amounts of the colloidal metallic sols, one may achieve a desired index of refraction for the coating while yet utilizing a sufficient quantity of the curable polymer to provide excellent adhesion of the coating to the substrate. Thus, in this embodiment, the invention provides a protective, thermosetting coating composition comprising, in a solvent, a curable polymer precursor comprising a hydrolyzed epoxy-functional alkoxysilane, an imidazole curing agent therefor, a first colloidal sol of an oxide of a metal selected from the group consisting of antimony, zirconium, cerium and tin, and a second colloid sol of a different metal oxide colloid having an index of refraction substantially different from said first colloid. Silica may be added (in sol form) as desired, and the coating composition may include various other coating ingredients such as flow control agents and the like.

In a preferred embodiment, the curable composition comprises, as a polymerizable epoxy-functional monomer or oligomer, an hydrolysis product of an epoxy-functional alkylalkoxy silane such as an gamma-glycidoxyalkyl trialkoxy silane.

DESCRIPTION OF THE PREFERRED EMBODIMENT

The solvent employed in the coating compositions of the invention preferably is organic, although small amounts of water may be tolerated as needed. The solvent preferably is a lower boiling alcohol such a $C_1-C_4$ alcohol (ethanol and isopropanol being preferred), a ketone such as acetone, methyl ethyl ketone, methyl propyl ketone, methyl isobutyl ketone, or mixtures thereof. Low boiling organic solvents generally are preferred because they permit a thin coating of the composition to dry quickly. However, in some instances it may be desired to employ one or more higher boiling solvents for the purpose of obtaining uniform, defect-free coatings, and solvents such as the glycol ethers (e.g., propylene glycol monomethyl ether) are appropriate for this purpose.

The primary polymeric binder for the coating composition are the partial or complete hydrolysis products of epoxy-functional alkoxy silanes and particularly the gamma glycidoxyalkyl trialkoxy silanes of which gamma-glycidoxypropyl triethoxy silane is exemplary. Compounds of this type commonly have the formula

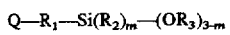

wherein $R_1$ is a $C_1$–$C_{14}$ alkylene group, $R_2$ and $R_3$ independently are $C_1$–$C_4$ alkyl groups and Q is a glycidoxy or epoxycyclohexyl group, and m is 0 or 1. The alkoxy groups are at least partially hydrolyzed to form silanol groups with the release of the $R_3OH$ alcohol, and some condensation of the silanol groups occurs. Epoxy reactivity is preserved, however. Many epoxy-functional alkoxysilanes are suitable as hydrolysis precursors, including the following: glycidoxymethyl-trimethoxysilane, glycidoxymethyltriethoxysilane, glycidoxymethyltripropoxysilane, glycidoxymethyltributoxysilane, beta-glycidoxyethyltrimethoxysilane, beta-glycidoxyethyltriethoxysilane, beta-glycidoxyethyltripropoxysilane, beta-glycidoxyethyltributoxysilane, beta-glycidoxyethyltrimethoxysilane, alpha-glycidoxyethyltriethoxysilane, alpha-glycidoxyethyl-tripropoxysilane, alpha-glycidoxyethyltributoxysilane, gamma-glycidoxypropyl- trimethoxysilane, gamma-glycidoxypropyl-triethoxysilane, gamma-glycidoxypropyl-tripropoxysilane, gamma-glycidoxypropyltributoxysilane, beta-glycidoxypropyl-trimethoxysilane, beta-glycidoxypropyl-triethoxysilane, beta-glycidoxypropyl-tripropoxysilane, beta-glycidoxypropyltributoxysilane, alpha-glycidoxypropyl-trimethoxysilane, alpha-glycidoxypropyl-triethoxysilane, alpha-glycidoxypropyl-tripropoxysilane, alpha-glycidoxypropyltributoxysilane, gamma glycidoxybutyl-trimethoxysilane, delta-glycidoxybutyl-triethoxysilane, delta-glycidoxybutyl-tripropoxysilane, delta-glycidoxybutyl-tributoxysilane, delta-glycidoxybutyl-trimethoxysilane, gamma-glycidoxybutyl-triethoxysilane, gamma-glycidoxybutyl-tripropoxysilane, gamma-propoxybutyl-tributoxysilane, delta-glycidoxybutyl-trimethoxysilane, delta-glycidoxybutyl-triethoxysilane, delta-glycidoxybutyl-tripropoxysilane, alpha-glycidoxybutyl-trimethoxysilane, alpha-glycidoxybutyl-triethoxysilane, and alpha-glycidoxybutyl-tripropoxysilane, alpha-glycidoxybutyl-tributoxysilane.

Hydrolysis of the epoxy-functional alkoxysilane precursor may be effected by adding enough water to partially or fully hydrolyze the available alkoxy groups. Normally, an approximately equal amount of water soluble alcohol, such as ethanol or methanol, is added to aid solubility and enough acid, such as hydrochloric or acetic is added to lower the pH to about 4.0–4.5. The mixture is then preferably equilibrated, or ripened, for a sufficient period of time for the partial hydrolysis to occur. Volatiles, such as the volatile alcohol byproduct, may or may not be stripped off. Desirably, enough water is added to hydrolyze at least two thirds of the alkoxy groups initially present.

Various additional non-silane, epoxy-functional compounds can be employed in the composition of the invention. Appropriate glycidyl ethers include triglycidyl ether, γ-glycidoxypropyl trimethoxy silane, triglycidyl ether, 1,4-butanediol diglycidyl ether, Bisphenol A diglycidyl ether, the $C_8$–$C_{14}$ alkyl glycidyl ethers, butyl glycidyl ether, cresyl glycidyl ether, phenyl glycidyl ether, nonylphenyl glycidyl ether, p-tert-butylphenyl glycidyl ether, 1,4-butanediol diglycidyl ether, neopentyl glycol diglycidyl ether, resorcinol diglycidyl ether, polyglycidyl ethers of aliphatic polyols, cyclohexane dimethanol diglycidyl ether, 2-ethylhexyl glycidyl ether, polyglycol diepoxide, polyglycidyl ether of castor oil, trimethylolethane triglycidyl ether, trimethylolpropane triglycidyl ether, and dibromoneopentyl glycol diglycidyl ether.

Imidazole curing agents have been employed for the purpose of curing epoxy-functional compounds and are useful in the present invention. Preferred are alkyl substituted or disubstituted imidazoles and particularly lower alkyl ($C_1$–$C_4$) substituted imidazoles of which 2-ethyl-4-methyl imidazole is preferred because of its availability and effectiveness. The imidazoles employed in the coating compositions of the invention are capable of curing the epoxy-functional ingredients at temperatures below about 70°C., and have the general formula

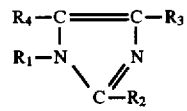

in which $R_1$ is H, alkyl, aryl, aralkyl (e.g., benzyl), or

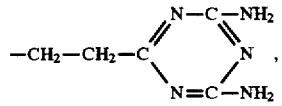

$R_2$ is H, alkyl or aryl, $R_3$ is H, alkyl, or hydroxyalkyl (e.g., hydroxyethyl), and $R_4$ is H, alkyl or hydroxyalkyl. Suitable imidazoles include the preferred 2-ethyl-4-methyl-imidazole, 2-methyl-imidazole, 1-benzyl-imidazole, 2-phenyl-imidazole, 2-phenyl-4,5-dihydroxymethyl-imidazole and 2-heptadecyl-imidazole; of these, 2-ethyl-4-methyl-imidazole, 2-methyl-imidazole, 2-phenyl-imidazole and 1-benzyl-imidazole are most preferred. The imidazole curing agent is used in a concentration of from about 1% to about 10% and preferably at about 5%, based on the weight of the epoxy functional ingredient.

Of the one or more colloidal sols that are employed in coatings of the invention, one is a colloid sol of an oxide of antimony, zirconium, cerium and tin. If another colloidal metal oxide sol is used also, it preferably is a metal oxide colloid different from the first colloid and that preferably has an index of refraction that is substantially different from the index of refraction of the first colloid; that is, the difference between the indices of refraction of the first and second colloids is at least 10% of the value of the colloid having the lower index of refraction. The index of refraction of $Sb_2O_5$, is about 1.67, whereas the index of refraction of $Zr_2O_5$, is about 2.2. Silicon dioxide may be used as desired, the index of refraction of $SiO_2$ being about 1.45.

Example 1

A thermosetting composition capable of forming a high refractive index coating with good abrasion resistance and tintability (that is, the ability to accept dye) was made as follows: The following precursor compositions were made:

| Precursor Composition No. 1 | |
|---|---|
| γ-glycidoxy propyl trimethoxysilane | 100 g |
| Water | 22.9 g |
| Concentrated hydrochloric acid | 1.2 g |
| Precursor Composition No. 2 | |
| γ-glycidoxy propyl trimethoxysilane | 100 g |
| Zirconium oxide sol | 72.4 g |
| (20% solids in water/15% acetic acid) | |

Both precursor compositions were processed separately by combining the ingredients and mixing for 16–24 hours at room temperature to cause partial hydrolysis of the epoxy-functional alkoxy silane ingredient. Using precursor composition No. 1, the following coating composition was made by blending together the following ingredients:

| | |
|---|---|
| Precursor composition No. 1 | 100 g |
| Antimony pentoxide sol, 30% solids in methanol | 360 g |
| Methyl propyl ketone | 48.0 g |
| 2-ethyl-4-methyl-imidazole | 5 g |
| Fluorocarbon flow control agent (FC 430, 3M Company) | 4.5 g |

The coating composition was spin coated onto a polycarbonate substrate and cured 2 hours at 120° C. Visually, the cured film was clear and showed no interference fringes. The cured coating lost 7% of its transmissivity when tested for 200 revolutions in accordance with ASTM D 1044-78 utilizing a Model 5130 Taber Abrader equipped with abrasive wheels weighted at 500 g. The resistance to abrasion may also be assessed by rubbing the coated surface with 0000 steel wool, using moderate manual pressure. After fifty back and forth rubs, the change in haze is measured by measuring the percentage change in transmissivity, and for this coating the change in haze measured 2%. Tintability (the ability of the coating to take up dye) was found to be very good. Adhesion was measured using adhesion test ASTM 3359. This test involves scoring the cured coating in cross hatch fashion followed by an attempt to lift cross hatched portions of the coating from the substrate through the use of a pressure sensitive adhesive tape that is applied to the surface and then pulled away. Adhesion measured 100%; that is, none of the coating was removed.

Example 2

The following ingredients were mixed and allowed to stand for 12–16 hours at room temperature:

| | |
|---|---|
| Propylene glycol monomethyl ether | 106.4 g |
| Precursor Composition No. 2 | 100 g |
| Precursor Composition No. 1 | 30.5 g |
| Antimony pentoxide sol (30% in methanol) | 144 g |

To the resulting composition was added 4.8 g of 2-ethyl-4-methyl-imidazole and 3.1 g of flow control agent FC 430. The composition was gently stirred until it was homogeneous, and was spin coated onto a polycarbonate substrate and cured, as in Example 1, for 2 hours at 120° C. The resulting film had the optical characteristics of the film of Example 1, was highly adherent to the substrate (none of the coating was pulled off under ASTM 3359), but the coating had substantially better abrasion resistance than the coating of Example 1, the film losing only 4% in transmissivity when subjected to the same Taber Abrader test and 1% when subjected to the steel wool test referred to above. Tintability, similarly, was excellent.

Example 3

The following coating composition was prepared:

| | |
|---|---|
| Precursor Composition No. 2 | 100 g |
| Precursor Composition No. 1 | 12.6 g |
| Antimony pentoxide sol (30% by weight in methanol) | 144.1 g |
| Propylene glycol monomethyl ether | 135.3 g |
| Colloidal silica (30% by weight in isopropanol) | 38.2 g |

The above ingredients were gently mixed and allowed to stand 12–16 hours. To the resulting composition was added 4.7 g of 2-ethyl-4-methyl imidazole and 2.9 g of the FC 430 fluorocarbon flow control agent. The composition was coated and cured on a polycarbonate substrate as in Examples 1 and 2. Adhesion and tintability remained excellent, and the increase in haze when tested with the Taber Abrader was 4.5%. No haze increase was noted when the coating was rubbed with steel wool.

While preferred embodiments of the present invention have been described, it should be understood that various changes, adaptations and modifications may be made therein without departing from the spirit of the invention and the scope of the appended claims.

What is claimed is:

1. A protective, thermosetting coating composition comprising, in a solvent, a curable polymer precursor comprising a hydrolysis product of an epoxy-functional alkoxy silane and an imidazole curing agent therefor, and a colloidal sol of a first metal oxide colloid selected from the group consisting of oxides of antimony, zirconium, cerium and tin.

2. The thermosetting coating composition of claim 1 wherein the imidazole curing agent is a $C_1$–$C_4$ alkyl disubstituted imidazole.

3. The thermosetting coating composition of claim 1 wherein the imidazole curing agent is selected from the group consisting of 2-ethyl-4-methyl-imidazole, 2-methyl-imidazole, 1-benzyl-imidazole, and 2-phenyl-imidazole.

4. The composition of claim 3 wherein said curable polymer precursor comprises an hydrolysis product of an γ-glycidoxyalkyl trialkoxy silane.

5. The composition of claim 4 wherein said imidazole is 2-ethyl-4-methyl- imidazole.

6. The composition of claim 1 including a colloidal sol of a second metal oxide colloid different from the first metal oxide colloid.

7. The composition of claim 6 wherein said first colloid is an oxide of antimony and the second colloid is zirconia.

8. The composition of claim 1 including a colloid sol of silica.

9. The composition of claim 1 wherein the curable polymer precursor includes a non-silane epoxy-functional compound.

10. A protective, thermosetting coating composition comprising, in a solvent, a curable polymer precursor comprising a hydrolyzed epoxy-functional alkoxy silane and an imidazole curing agent therefor, a first colloid sol of a metal oxide selected from the group consisting of the oxides of antimony, zirconium, cerium and tin, and a second colloid sol of a metal oxide colloid having an index of refraction substantially greater or lesser than the index of refraction of the colloid of the first colloidal sol, the difference in the indices of refraction between the first and second colloids being at least 10% of the value of the lesser index of refraction.

11. The thermosetting coating composition of claim 10 wherein the imidazole curing agent is a $C_1$–$C_4$ alkyl disubstituted imidazole.

12. The thermosetting coating composition of claim 10 wherein the imidazole curing agent is selected from the group consisting of 2-ethyl-4-methyl-imidazole, 2-methyl-imidazole, 1-benzyl-imidazole, 2-phenyl-imidazole, 2-phenyl-4,5-dihydroxymethyl-imidazole, and 2-heptadecyl-imidazole.

13. The composition of claim 10 wherein said curable polymer precursor comprises an hydrolysis product of a γ-glycidoxyalkyl trialkoxy silane.

14. A protective, thermosetting coating composition comprising, in a solvent, a curable polymer precursor comprising a hydrolyzed γ-glycidoxyalkyl trialkoxy silane, a curing agent therefor comprising 2-ethyl-4-methyl-imidazole, a first colloid sol of an oxide of antimony, and a second colloid sol of zirconia.

15. The composition of claim 14 including a third colloid sol of silica.

16. A transparent coated object, comprising a transparent polycarbonate substrate, and a transparent, scratch-resistant coating tightly adhering directly to the substrate without an intermediate primer layer, said coating resulting from the thermal curing of a layer of a coating composition applied to the substrate, the coating composition comprising, in a solvent, a curable polymer precursor comprising a hydrolysis product of an epoxy-functional alkoxy silane and an imidazole curing agent therefor, and a colloidal sol of a first metal oxide colloid selected from the group consisting of oxides of antimony, zirconium, cerium and tin.

* * * * *